Sept. 6, 1966 M. P. SCHREINER 3,271,587

FOUR-TERMINAL SEMICONDUCTOR SWITCH CIRCUIT

Filed Nov. 13, 1962

MAX P. SCHREINER
*INVENTOR.*

BY D. Carl Richards

ATTORNEY

United States Patent Office 3,271,587
Patented Sept. 6, 1966

3,271,587
FOUR-TERMINAL SEMICONDUCTOR SWITCH CIRCUIT

Max P. Schreiner, Richardson, Tex., assignor to Texas Instruments Incorporated, Dallas, Tex., a corporation of Delaware Filed Nov. 13, 1962, Ser. No. 236,842
12 Claims. (Cl. 307—88.5)

This invention relates to semiconductor networks and, more particularly, to the control of the relative magnitudes of the turn-on and turn-off power in plural base negative resistance circuits.

Semiconductor devices of the switching class embody many desirable characteristics also found in prior art devices such as thyratrons insofar as turn-on effectiveness is concerned. In addition, they permit the termination of current flow through the switch element by application of a control pulse. In accordance with the application of Thomas R. Allen and Donald F. Cook, co-workers of applicant, filed concurrently herewith, entitled A Gate-controlled Switch, Serial No. 236,829, filed November 13, 1963, there is described a four-terminal semiconductor switch device in which two terminals are connected to separate spaced zones of a base layer. The present invention relates to a circuit arrangement for such a switch. More particularly, the invention relates to the control of the relative levels of power dissipation for the turn-on and turn-off functions.

By the present invention there is provided a semiconductor switch circuit which includes a four-layer negative resistance device. The device is provided with a plurality of base control terminals and an anode and a cathode connected in a current path including a source and a load element. The device is normally responsive to a turn-on pulse and a turn-off pulse of given respective magnitudes to initiate and terminate current flow through the device, respectively. Means are provided to apply to at least one of the base control terminals a bias function to modify the switching character of the device. Means are then provided for applying to a different one of the base control terminals switching pulses alternately of opposite polarity and of relative magnitudes dependent upon the magnitude and polarity of the bias function. Preferably the device is provided with two base terminals, one encircling the other, and separated therefrom with means to apply a bias function between the inner of the base terminals and the cathode and to apply control pulses between the outer base terminal and the cathode.

For a more complete understanding of the present invention and for further objects and advantages thereof, reference may now be had to the following description taken in conjunction with the accompanying drawings in which.

Figures 1, 5:
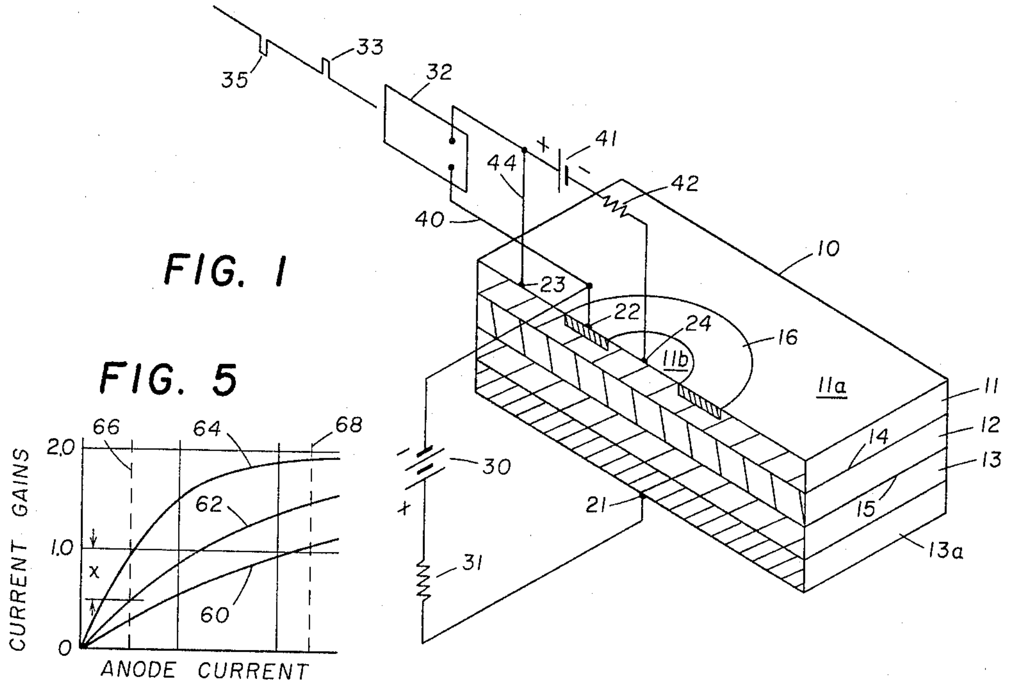
FIGURE 1 is a schematic circuit diagram with the switch device shown partially in section embodying the present invention.
FIGURE 5 is a graph of bias control of the gain in the units of FIGURES 1–4.

In FIGURE 1 there is illustrated a circuit including a semiconductor switch 10. The switch 10 is formed from a semiconductor wafer of one conductivity type and is characterized as a PNPN device. The wafer in the example shown in FIGURE 1 is of N-conductivity type. On wafer 10 is an upper surface layer 11 and a lower surface layer 13 of opposite conductivity type as to form rectifying junctions 14 and 15. The lower section 13*a* of the layer 13 is more heavily doped than the remainder of the layer so that a high amplitude current may be accommodated. An emitter in the form of a ring 16 is formed in the upper surface of the layer 11 dividing the surface exposure of layer 11 into two zones 11*a* and 11*b*.

Ohmic contacts 21–24 are provided for completing circuits to the device 10. The terminal 21 leads to the lower surface of the P+ layer 13*a*. The terminal 22 provides for connection to the emitter 16. The terminal 23 provides for connection to the surface zone 11*a* and the terminal 24 provides for connection to the surface zone 11*b*.

In the circuit illustrated in FIGURE 1, the current path from a battery 30 leading to a load resistor 31 is controlled by the switch 10 through the application of gating pulses such as pulses 33 and 35 from a control unit 32. The control unit 32 is connected by way of conductor 40 to the terminal 22, and by way of bias battery 41 and resistor 42, to the terminal 24 on zone 11*b*. The second terminal of control unit 32 is also connected by way of conductor 44 to the base terminal 23. The battery 30 is connected at its negative terminal to the emitter contact 22. The load resistor 31 is connected to the lower terminal 21.

The present invention provides for the application of bias voltages to a four-terminal PNPN device having two base contacts, such that a transverse flow of minority carriers is produced in the region of the emitter-base rectifying contact thereby permitting selective control of the magnitude of the power required for the turn-on operation relative to the power required for the turn-off operation.

The device 10 may be formed such that a supply of carriers is produced therein upon the establishment of a condition such that the sum of the current gains of the PNP and NPN sections of the device is equal to or greater than 1.0. A first section of the device to which a discussion of current gain is applicable is the PNP device formed by layers 12, 13 and 14. The second section embodied in the unit of FIGURE 1 is the NPN section formed by the layers 12, 11 and the emitter 16. The application of the bias voltage from battery 41 between the gate electrodes 23 and 24 establishes a transverse flow of carrier current in the region of the rectifying junction between the emitter layer 16 and the base layer 11 so that the sum of the current gains in the two sections may be slightly below or just about equal to 1.0. Thereafter, the pulses, such as positive pulse 33, may be applied from source 32 to raise the current gain so that the sum is above 1.0 to initiate current flow from battery 30 through the path comprising the emitter contact 22 and the contact 21. If the quiescent status of the device is such that the current gains approach but are slightly greater than unity, a negative pulse 35 may be applied to lower the sum of the current gains below 1.0 so that conduction through the device will be immediately terminated.

Many prior art devices of the general class to which this invention relates are characterized by the requirement of relatively low turn-on power. However, once the devices are in conduction, it is difficult to turn them off. The circuit including the four-terminal device illustrated in FIG 1, having spaced and separate base zones to which a biasing voltage is applied, permits an increase of the turn-off gain to a point equal to or even greater than that of the turn-on gain.

Figure 2:
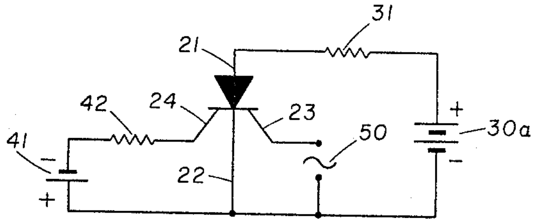
FIGURE 2 is a modification of the circuit of FIGURE 1 in which the bias voltage is applied to one of the gate control terminals and the input or control signal is applied to the other of the gate terminals.
Figure 3:
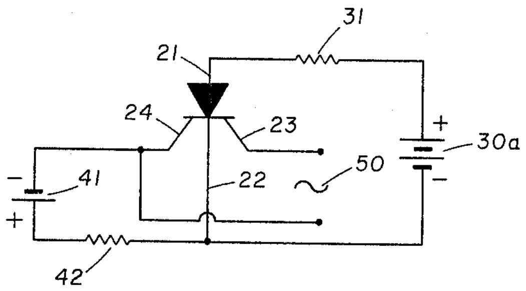
FIGURE 3 is a modification in which the control signal is applied between the control gate terminals.

The embodiments of the invention illustrated in FIGURES 1–3 illustrate variations in the method of reduction of the power necessary to switch the anode current off or on. A reduction in power necessary to turn the anode current on may be obtained by reversing the bias voltage polarities from those shown in the circuits. It will be recognized that any increase in turn-on gain or turn-off gain obtained by biasing networks will be at the expense of the other. One switching method illustrated by FIGURE 4 allows complete isolation of the switching circuit from the anode circuit and thus provides a desirable mode of operation.

With the circuit illustrated in FIGURE 1, the switching device 10 is biased with transverse gate current flow in order to increase the turn-off gain for the circuit connected to terminals 23 and 22. With the bias voltage polarity as shown, the turn-on current gain is decreased from that effective at the no-bias condition. Thus, negative gate current at terminal 23 necessary to switch off the device is decreased from the level required to turn off an unbiased switch.

In FIGURE 2 a four-terminal device of the type shown in FIGURE 1 is illustrated schematically with like parts being given the same reference characters as in FIGURE 1. The anode terminal 21 and the cathode terminal 22 are connected to a voltage source 30*a* by the way of resistor 31 as in FIGURE 1. However, in this embodiment, the second gate terminal 24 is connected by way of resistance 42 and battery 41 to the cathode terminal 22. The control signal represented by wave form 50 is connected between the outside gate terminal 23 and the cathode terminal 22. The presence of the battery 41 serves to increase the turn-off gain of the device. This bias may be increased until just before the gate 24 turn-off condition exists and then a very small increase in the current applied to gate 23 will turn off large anode currents. The gate 23 has a turn-on current gain degraded according to the amount of bias on gate 24.

FIGURE 3 shows a circuit with the gate to cathode bias applied between the outer gate and the cathode. The signal voltage is applied directly between the two gate electrodes 23 and 24. This circuit does not allow as great an increase in turn-off gain as is possible with the circuit of FIGURE 2. However, the gate input circuit has low voltage isolation from the anode circuit and at the same time has some increase in turn-off gain.

Figure 4:
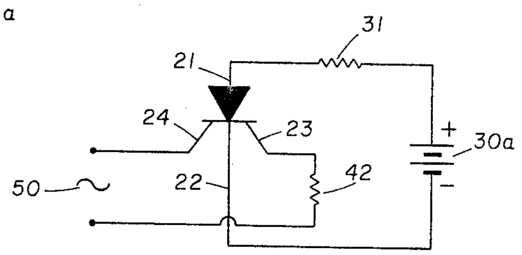
FIGURE 4 is a modification in which the turn-on and turn-off control pulses are applied between the control gate terminals with isolation as to the current path.

In FIGURE 4 higher power requirements are necessary in order to switch high anode-cathode currents off. However, in this circuit there is complete isolation of the input circuit from the output circuit. The control signal source must be capable of higher current requirements than in any of the modifications of FIGURES 1–3 in order to turn off the device.

In embodiments above described, turn-off control is accomplished through establishment of transverse flow of minority carriers in the region of the rectifying contact between the emitter and base where the base has spaced and separate surface exposures to which control potentials may be applied.

In one embodiment of the device fabricated to switch anode-cathode currents of the order of 2 amperes, the device of FIGURE 2 had a turn-off gain of more than 100 at a bias voltage of 1.5 volts. In the circuit of FIGURE 4, about 330 milliamperes were required to switch 2 amperes in the anode-cathode circuit.

The operation was of the character illustrated in FIGURE 5, the graph which shows variations in the operation of the devices employed in FIGURES 1–4 for variations in the biasing voltage. More particularly, the ordinates are plotted as a function of the sum of the current gains for the PNP and NPN portions of the device. This factor is plotted as a function of anode current. Curves 60, 62 and 64 represent different structures having different switching characteristics. When the sum of the current gains exceeds 1.0, the device will conduct. When the sum of the current gains is less than 1.0, the device will be switched off. Thus, the three curves 60, 62 and 64 represent widely varying switch structures. At an anode current of magnitude represented by the dotted line 66, it will be noted that curve 64 is just above 1.0. However, as to the device represented by the curve 62, if a bias voltage is applied of such magnitude as to change the current gain by the factor X, then the device can be switched on and off with application of pulses alternately of opposite polarity but of very small magnitude. The application of a biasing function effectively shifts the curve 62 to a condition corresponding with the curve 64 at the level of anode current represented by the dotted line 66. In many cases even though the switch unit requires a high power turn-off pulse, as would be the case for turning off the device represented by the curve 64 at a current represented by the dotted line 68, it is possible to apply a bias of such polarity and magnitude as to permit turn-on and turn-off at predetermined relative power levels. Thus, the present invention relates to four-layer negative resistance devices having multiple base terminals with controllable turn-on ability and turn-off ability by controlling the operating point by a suitable bias. It will be understood that circuits of the present invention include a four-layer negative resistance device having an anode, a cathode and multiple base control terminals. The device normally is responsive to a turn-on pulse and a turn-off pulse of given respective magnitudes to initiate and terminate current flow therethrough and in a circuit connected to said device at the anode and cathode thereof. Means are connected at at least one of the base control terminals to apply a bias function to modify the switch characteristics of the device. Means are then provided for applying switching pulses at at least one of the base control terminals of magnitudes dependent upon the magnitude and polarity of the bias function.

Having described the invention in connection with certain specific embodiments thereof, it is to be understood that further modifications may now suggest themselves to those skilled in the art and it is intended to cover such modifications as fall within the scope of the appended claims.

What is claimed is:

1. A semiconductor switching circuit which comprises:
(a) a four-layer negative resistance device having an anode, cathode and multiple base control terminals, and normally capable of being turned off only by a control pulse of magnitude substantially exceeding the magnitude of a turn-on pulse,
(b) a current source and a load connected in series with the anode and cathode terminals of said device,
(c) means connected between said cathode and one of said base control terminals to apply a bias function to modify the switching character of said device, and
(d) means to apply turn-on and turn-off pulses to at least one of said base control terminals, the relative magnitudes of which are dependent upon the magnitude and polarity of said bias function.

2. A semiconductor switching circuit which comprises:
(a) a four-layer negative resistance device having an anode, cathode and multiple base control terminals, and normally capable of being turned off only by a control pulse of magnitude substantially exceeding the magnitude of a turn-on pulse,
(b) a current source and a load connected in series with the anode and cathode of said device,
(c) means connected between said cathode and one of said base control terminals to apply a bias function to modify the switching character of said device, and
(d) means connected between said cathode and the other of said base control terminals to apply turn-on and turn-off pulses.

3. A semiconductor switching circuit which comprises:
(a) a four-layer negative resistance device having a base layer, an anode and a cathode, (b) a current source and a load connected in series with the anode and cathode of said device, (c) means for establishing a transverse current in said base layer in the region adjacent to the junction between said base layer and said cathode to modify the switching character of said device, and (d) means for alternately raising and lowering the potential of said cathode relative to said base layer for initiating and terminating flow of current from said source.

4. A semiconductor switching circuit which comprises:

(a) a four-layer negative resistance device having a base layer, an anode and a cathode with the cathode of configuration dividing the surface of said base layer into two spaced apart zones, (b) a current source and a load connected in series with said anode and cathode, (c) means for establishing a transverse current in said base layer in the region adjacent to the junction between said base layer and said cathode to modify the switching character of said device, and (d) means for alternately raising and lowering the potential of said cathode relative to said base layer for initiating and terminating flow of current from said source.

5. A semiconductor switching circuit which comprises:

(a) a four-layer negative resistance device having a base layer, an anode and a cathode with the cathode dividing the surface of said base layer into two spaced apart zones, (b) a current source and a load connected in series with the anode and cathode of said device, (c) means connected to at least one of said zones for establishing a transverse current in said base layer in the region adjacent to the junction between said base layer and said cathode to modify the switching character of said device, and (d) means connected to at least one of said zones for alternately changing in opposite senses the sum of current gains in said device from below to above unity and from above to below unity for initiating and terminating, respectively, the flow of current from said source.

6. A semiconductor switch for a current path which comprises:

(a) a four-layer negative resistance device having an anode, cathode and multiple base control terminals, normally responsive to a turn-on pulse and to a turn-off pulse of given respective magnitudes to initiate and terminate current flow therethrough and connected in said current path at said anode and cathode, (b) means connected to at least one of said base control terminals to apply a bias function to modify the switching character of said device, and (c) means to apply switching pulses to at least one of said base control terminals of magnitudes dependent upon the magnitude and polarity of said bias function.

7. A semiconductor switch for a current path which comprises:

(a) a four-layer negative resistance device having an anode, cathode and two base control terminals, normally responsive to a turn-on pulse and to a turn-off pulse of given respective magnitudes to initiate and terminate current flow therethrough and connected in said current path at said anode and cathode, (b) means connected to one of said base control terminals to apply a bias function to modify the switching character of said device, and (c) means to apply switching pulses alternately of opposite polarity to the other of said base control terminals of magnitudes dependent upon the magnitude and polarity of said bias function.

8. A semiconductor switching circuit which comprises:

(a) a four-layer solid state negative resistance device including a base layer, an anode and a cathode with the cathode dividing the surface of the base layer into two spaced zones, (b) a current source and a load connected in series with said anode and cathode, (c) a bias voltage source connected between said zones to establish transverse current in said base layer in the region adjacent the junction between said base layer and said cathode to modify the switching connection of said device, and (d) a control pulse source connected between one of said zones and said cathode for producing pulses alternately of opposite polarity to initiate and terminate, respectively, flow of current from said source.

9. A semiconductor switching circuit which comprises:

(a) a four-layer solid state negative resistance device including a base layer, an anode and a cathode with the cathode dividing the surface of the base layer into two spaced zones, (b) a current source and a load connected in series with said anode and cathode, (c) a bias voltage source connected between one of said zones and said cathode to establish transverse current in said base layer in the region adjacent the junction between said base layer and said cathode to modify the switching connection of said device, and (d) a control pulse source connected between the other of said zones and said cathode for producing pulses alternately of opposite polarity to initiate and terminate, respectively, flow of current from said source.

10. A semiconductor switching circuit which comprises:

(a) a four-layer solid state negative resistance device including a base layer, an anode and a ring cathode with the cathode dividing the surface of the base layer into an inner zone and an outer zone, (b) a current source and a load connected in series with said anode and cathode, (c) a bias voltage source connected between said inner zone and said cathode to establish transverse current in said base layer in the region adjacent the junction between said base layer and said cathode to modify the switching connection of said device, and (d) a control pulse source connected between said outer zone and said cathode for producing pulses alternately of opposite polarity to initiate and terminate, respectively, flow of current from said source.

11. A semiconductor switching circuit which comprises:

(a) a four-layer solid state negative resistance device including a base layer, an anode and a ring cathode with the cathode dividing the surface of the base layer into an inner zone and an outer zone, (b) a current source and a load connected in series with said anode and cathode, (c) a bias voltage source connected between said outer zone and said cathode to establish transverse current in said base layer in the region adjacent the junction between said base layer and said cathode to modify the switching connection of said device, and (d) a control pulse source connected between said inner zone and said cathode for producing pulses alternately of opposite polarity to initiate and terminate, respectively, flow of current from said source.

12. A semiconductor switching circuit which comprises:

(a) a four-layer solid state negative resistance device including a base layer, an anode and a ring cathode with the cathode dividing the surface of the base layer into an inner zone and an outer zone, (b) a current source and a load connected in series with said anode and cathode, (c) a bias voltage source connected between one of the inner and outer zones and said cathode to establish transverse current in said base layer in the region adjacent the junction between said base layer and said cathode to modify the switching connection of said device, and (d) a control pulse source connected between said zones for producing pulses alternately of opposite polarity to initiate and terminate, respectively, flow of current from said source.

References Cited by the Examiner

UNITED STATES PATENTS

| | | | |
|---|---|---|---|
| 3,097,335 | 7/1963 | Schmidt | 307—88.5 |
| 3,210,563 | 10/1965 | New | 317—235 |

JOHN W. HUCKERT, *Primary Examiner.*

R. F. POLISSACK, *Assistant Examiner.*